(12) United States Patent
Yeung et al.

(10) Patent No.: US 10,510,134 B2
(45) Date of Patent: Dec. 17, 2019

(54) TRANSFORMATION OF DYNAMIC METADATA TO SUPPORT ALTERNATE TONE RENDERING

(71) Applicant: Dolby Laboratories Licensing Corporation, San Francisco, CA (US)

(72) Inventors: Raymond Yeung, Los Angeles, CA (US); Patrick Griffis, Sunnyvale, CA (US); Thaddeus Beier, Lafayette, CA (US); Robin Atkins, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/880,438

(22) Filed: Jan. 25, 2018

(65) Prior Publication Data

US 2018/0160089 A1    Jun. 7, 2018

Related U.S. Application Data

(63) Continuation of application No. 15/584,368, filed on May 2, 2017, now Pat. No. 9,916,638.
(Continued)

(51) Int. Cl.
*G06T 11/00*    (2006.01)
*G06T 1/20*    (2006.01)
(Continued)

(52) U.S. Cl.
CPC ............ *G06T 1/20* (2013.01); *G06T 5/009* (2013.01); *H04N 5/20* (2013.01); *H04N 5/202* (2013.01);
(Continued)

(58) Field of Classification Search
USPC ....................................................... 345/604
See application file for complete search history.

(56) References Cited

U.S. PATENT DOCUMENTS 8,593,480 B1    11/2013    Ballestad
2003/0038807 A1    2/2003    Demos
(Continued)

FOREIGN PATENT DOCUMENTS

CN    103891294    6/2014
RU    2352081    4/2009
(Continued)

OTHER PUBLICATIONS

SMPTE ST 2084:2014, "High Dynamic Range Electro-Optical Transfer Function of Mastering Reference Displays" pp. 1-14, Aug. 29, 2014.
(Continued)

*Primary Examiner* — Wesner Sajous

(57) ABSTRACT

An existing metadata set that is specific to a color volume transformation model is transformed to a metadata set that is specific to a distinctly different color volume transformation model. For example, source content metadata for a first color volume transformation model is received. This source metadata determines a specific color volume transformation, such as a sigmoidal tone map curve. The specific color volume transformation is mapped to a color volume transformation of a second color volume transformation model, e.g., a Bézier tone map curve. Mapping can be a best fit curve, or a reasonable approximation. Mapping results in metadata values used for the second color volume transformation model (e.g., one or more Bézier curve knee points and anchors). Thus, devices configured for the second color volume transformation model can reasonably render source content according to received source content metadata of the first color volume transformation model.

13 Claims, 4 Drawing Sheets

Related U.S. Application Data

(60) Provisional application No. 62/364,780, filed on Jul. 20, 2016.

(51) Int. Cl.

| | |
|---|---|
| *G06T 3/40* | (2006.01) |
| *G06T 5/00* | (2006.01) |
| *G06T 5/40* | (2006.01) |
| *H04N 1/60* | (2006.01) |
| *H04N 9/64* | (2006.01) |
| *H04N 9/68* | (2006.01) |
| *G09G 5/02* | (2006.01) |
| *G09G 5/06* | (2006.01) |
| *H04N 5/202* | (2006.01) |
| *H04N 5/20* | (2006.01) |
| *H04N 1/32* | (2006.01) |

(52) U.S. Cl.
CPC ............... *H04N 9/64* (2013.01); *H04N 9/68* (2013.01); *G06T 2207/20208* (2013.01); *H04N 1/32101* (2013.01)

(56) References Cited

U.S. PATENT DOCUMENTS

| | | | |
|---|---|---|---|
| 2014/0210847 A1* | 7/2014 | Knibbeler | G09G 5/006 345/589 |
| 2015/0078661 A1 | 3/2015 | Granados | |
| 2015/0221280 A1 | 8/2015 | Van Der Vleuten | |
| 2015/0245044 A1* | 8/2015 | Guo | H04N 19/98 375/240.03 |
| 2015/0248747 A1 | 9/2015 | Atkins | |
| 2016/0044277 A1 | 2/2016 | Oh | |
| 2016/0080716 A1* | 3/2016 | Atkins | H04N 5/44504 348/599 |
| 2016/0203618 A1 | 7/2016 | Li | |
| 2016/0248939 A1 | 8/2016 | Thurston, III | |
| 2016/0295220 A1 | 10/2016 | Oh | |
| 2016/0345040 A1* | 11/2016 | Oh | H04N 21/2343 |
| 2017/0048561 A1* | 2/2017 | Oh | H04N 21/23 |
| 2017/0116955 A1 | 4/2017 | Stauder | |

FOREIGN PATENT DOCUMENTS

| | | |
|---|---|---|
| RU | 2014116971 | 11/2015 |
| WO | 2014/130343 | 8/2014 |

OTHER PUBLICATIONS

SMPTE ST 2086:2014 (Oct. 13, 2014), "Mastering Display Color Volume Metadata Supporting High Luminance and Wide Color Gamut Image" pp. 1-6, Oct. 30, 2014.

SMPTE ST 2094-1:2016: "Dynamic Metadata for Color Volume Transform—Core Components" Jun. 13, 2016, pp. 1-15.

SMPTE ST 2094-10:2016: "Dynamic Metadata for Color Volume Transform—Application #1" pp. 1-15, Jun. 13, 2016.

SMPTE ST 2094-20:2016: "Dynamic Metadata for Color Volume Transform—Application #2" pp. 1-23, Jul. 21, 2016.

SMPTE ST 2094-30:2016: "Dynamic Metadata for Color Volume Transform—Application #3" pp. 1-15, Jul. 21, 2016.

SMPTE ST 2094-40:2016: "Dynamic Metadata for Color Volume Transform—Application #4" pp. 1-26, Sep. 7, 2016.

* cited by examiner

TRANSFORMATION OF DYNAMIC METADATA TO SUPPORT ALTERNATE TONE RENDERING

TECHNOLOGY

The present invention relates generally to the transformation of metadata. More particularly, an embodiment of the present invention relates to computing a metadata set specific for a color volume transformation (CVT) model using an existing metadata set that is specific to a distinctly different CVT model.

BACKGROUND

Content mastered for ultra-high definition television (UHDTV) is becoming widely available with the introduction of high dynamic range (HDR) systems. These systems provide an immersive experience with more life-like reproduction of video content. A typical HDR system is characterized by:
- high peak luminance (e.g., at least 700, 1000, 2000, or 10000 cd/m$^2$);
- HDR electro-optical transfer function (EOTF) (e.g., SMPTE ST 2084:2014, "High Dynamic Range Electro-Optical Transfer Function of Mastering Reference Displays;" or Hybrid Log-Gamma, ITU-R Recommendation BT.2100-0 (July 2016), as well as BBC Research & Development White Paper WHP 283, July 2014, "Non-linear Opto-Electrical Transfer Functions for High Dynamic Range Television");
- wide color gamut (e.g. DCI-P3, ITU-R Recommendation BT. Rec. 2020, or greater);
- increased contrast ratio (e.g., at least 800:1, 5000:1, or 10000:1); and
- 4K pixel resolution or greater (e.g., 3840×2160 pixels, 4096×2160 pixels, 7680×4320 pixels, or the like).

Predictably, disparate UHDTV content formats will emerge. For example, UHDTV formats can rely on different CVT models based on parametric tone mapping metadata, content-dependent dynamic metadata, and/or reference display metadata, or even no metadata at all. Ideally, irrespective of HDR content format, an HDR system should maintain artistic intent—color and brightest, to at least a reasonable extent. Reasonable rendering is assured by archiving content mastered in each of the HDR formats to be supported. However, this simplistic solution requires larger memory storage, longer content creation time, and increased complexity in content delivery.

The inventors appreciate that transitioning from one HDR format in a computationally efficient manner is preferable. An HDR device should accurately render content mastered in another format (such as, one based on a distinctly different CVT model), or at least render a perceptually reasonable approximation, based on available metadata.

BRIEF DESCRIPTION OF THE DRAWINGS

Embodiments of the instant invention are illustrated by way of examples, and not in way by limitation, in the figures of the accompanying drawings and in which like reference numerals refer to similar elements and in which.

SUMMARY

Figure 1A:
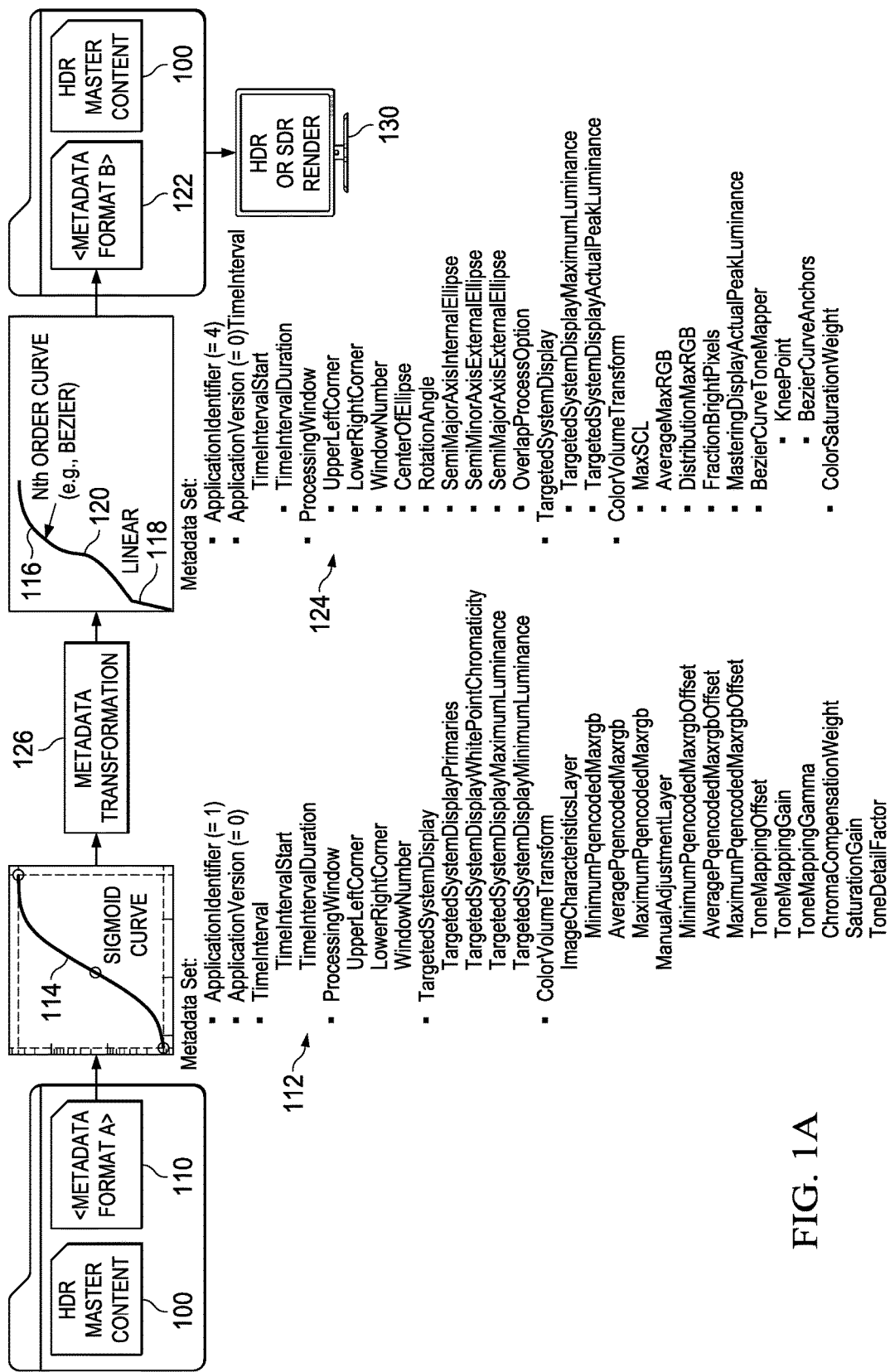
FIG. 1A depicts a simplified flowchart depicting one embodiment of the invention.

The invention is defined by the independent claims, taking due account of any element which is equivalent to an element specified in the claims. The dependent claims concern optional features of some embodiments of the invention.

In a first embodiment, source content metadata is transformed for a differing CVT model. In this embodiment, source content metadata for a first CVT model is received. A first transfer curve for the first CVT model based on the received source content metadata can be computed. The first transfer curve of the first CVT model can be mapped (e.g., best fit or reasonable approximation) to a second transfer curve of a second CVT model. The mapping generates content metadata for the second CVT model. The generated content metadata can be used for rendering source content by devices operating under the second CVT model.

In a second embodiment, an apparatus for enhancing reproduction of high dynamic range content has a means for receiving source content metadata for a first color volume transformation model and a means for determining a first transfer curve for the first color volume transformation model based on the received source content metadata. The apparatus further has a means for mapping the first transfer curve of the first color volume transformation model to a second transfer curve of a second color volume transformation model, wherein the mapping generates content metadata for the second color volume transformation model.

In a third embodiment, an apparatus for enhancing reproduction of high dynamic range content has at least one electronic device that receives source content metadata for a first color volume transformation model and at least one secondary electronic device that determines a first transfer curve for the first color volume transformation model based on the received source content metadata, wherein the at least one secondary electronic device is at least one of the at least one electronic device and another electronic device. The apparatus also has at least one tertiary devices that maps the first transfer curve of the first color volume transformation model to a second transfer curve of a second color volume transformation model, wherein the at least one tertiary device is at least one of the at least one electronic device, at least one secondary electronic device and another electronic device and wherein the mapping generates content metadata for the second color volume transformation model.

In a fourth embodiment, a method of transforming dynamic metadata that comprises receiving source content and generating source content metadata for a first color volume transformation model associated with said source content. The method further comprises determining a first transfer curve for the first color volume transformation model based on the generated source content metadata and mapping the first transfer curve of the first color volume transformation model to a second transfer curve of a second color volume transformation model where said mapping generates content metadata for the second color volume transformation model.

DESCRIPTION OF EXAMPLE EMBODIMENTS

Techniques are provided in this specification for creation, extraction, and/or derivation of CVT model parameters from a given combination of metadata of a different CVT model. These techniques can be employed by an HDR capable device (e.g., television, set-top box, computer tablet, smart phone, or smart watch), encoder or decoder, or color grading tool. One or more process steps, or an entirety of all steps, can be performed in real-time, non-real time or near real-time, in the cloud or offline, by a single device or multiple devices.

A general approach to create, extract, and/or derive CVT model parameters is to apply forward mapping using a first CVT model and the associated metadata, and determines parameters for a desired, second CVT model that result in an equivalent or best fit mapping. That is to say, certain techniques described by this specification teach optimization of a curve, or mathematical function, for the second CVT model that best fits data points of first CVT model by adjusting parameters of the second CVT model.

Ideally, source content metadata may be received, in those cases where only the source content is available, source content metadata may be determined from the source content.

In the following examples, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily obfuscating the present invention.

Example Methods

FIG. 1A depicts a simplified flowchart depicting one embodiment of the invention.

Source content 100, or HDR master content, is received. Source content 100 includes representations of video samples or pixels, whether compressed (lossless or lossy) or uncompressed. For example, source content 100 can be compressed in:

(i) JPEG 2000 (ISO/IEC 15444-1:2004);
(ii) Recommendation ITU-T H.265 (April 2015), "High efficiency video coding," including Main 10 profile;
(iii) Recommendation ITU-T H.264 (February 2016), "Advanced video coding for generic audiovisual services;" or
(iv) VP9 (e.g., "VP9 Bitstream & Decoding Process Specification—v0.6," dated 31 Mar. 2016).

Each of (i)-(iv) above is incorporated herein for all purposes.

Source content 100 can be associated with HDR metadata, e.g. source content metadata 110. HDR metadata, e.g. source content metadata 110 can include static metadata, dynamic metadata, or both. Static metadata describes the one or more reference mastering displays used to color grade source content 100—e.g. SMPTE ST 2086:2014 (Oct. 13, 2014), "Mastering Display Color Volume Metadata Supporting High Luminance and Wide Color Gamut Image," which is incorporated herein for all purposes.

On the other hand, dynamic metadata describes or is related to, without limitation, image characteristics, such as minimum, maximum, average, median luminance for a picture or a delineated group of pictures (e.g., a scene). Dynamic metadata can further include average intensity of a region, center pixel of the brightest region in a scene, scene peak, color saturation mapping weights, chrominance compensation weight, saturation gain, and the like. For each of the embodiments described by this specification dynamic metadata can be as defined, in part, by SMPTE ST 2094-1, -10, -20, -30, or -40, all of which are incorporated by references for all purposes (particularly, definitions and calculations for metadata parameters, e.g., linear or bilinear interpolation between samples).

A scene can be identified by time stamps (e.g., start time, end time, and/or time duration), picture order count (POC) (start POC, stop POC and/or POC difference), a film transition (e.g., fades—to black or any specific color, cuts, L cuts, dissolves, wipes, match cuts, and the like), markers in the bitstream, an adjustment in one or more coding parameters (e.g., persistence of any of film grain characteristics, frame packing arrangement, post-filter hint, tone mapping information, display orientation, decoded picture hash), or appearance of an instantaneous decoding refresh picture.

Pertinent to this specification, dynamic metadata can also describe a CVT model. The CVT model describes how source content 100 should be mapped to a different color volume. For example, a CVT model determines conversion from HDR to a reduced standard dynamic range (SDR), or mapping to a target display's color volume from the mastering color volume (which can be greater, smaller or otherwise different).

Source content 100 and source content metadata 110 can be received together in a bitstream or separately. The bitstream can be stored in computer memory, tangible computer readable media (e.g., optical disk or magnetic disk), or a non-volatile memory card, or can be an electromagnetic signal transmitted over a telecommunication network (e.g., the Internet, wireless service, telephone, short range wireless connection (e.g., Bluetooth), cable broadcast, satellite broadcast, and/or over-the-air television broadcast). From such a bitstream, source content metadata 110 can be extracted. In those instances where source content metadata is not available, it may be generated or determined from the source content.

In this specific embodiment, source content metadata 110 includes a metadata set 112 comprising both dynamic metadata (not shown) and static metadata. Dynamic metadata of metadata set 112 is associated with a specific CVT model characterized by a sigmoidal transfer function, e.g. sigmoidal transfer curve 114. Minimum, average, maximum color component values of the video scene (or single picture) are associated to minimum, average, and maximum values of the target display to define a sigmoidal transfer curve 114. Sigmoidal transfer curve 114 determines mapping of color component values to the target display. A specific implementation of a sigmoidal transfer function is described by U.S. Pat. No. 8,593,480, which is incorporated herein for all purposes. Dynamic metadata of metadata set 112 further includes parameters to adjust the transfer function, such as offsets (minimum, average, and maximum color component values), tone mapping gain, tone mapping offset, saturation gain, compensation weights, and the like. These parameters allow one or more fixed points to be set and/or control a slope of the curve in one or more regions.

In a specific embodiment, dynamic metadata, on a scene-by-scene basis (each having an identified time interval), describes a CVT model by one or more of the following parametric values:

a. a lowest, average, and highest perceptually quantized encoded maximum RGB value of the selected pixels throughout all images in the scene (can be normalized as [0, 1];
b. a minimum, average, maximum offset for the maximum RGB value;
c. tone mapping offset;
d. tone mapping gain;
e. tone mapping gamma (as an example, ranging [0.5, 1.5] in steps of 0.001 and defaulted to 1.0);

g. a chroma compensation weight, an amount for chroma adjustment (as an example, ranges [−0.5, 0.5]; and h. saturation gain, an amount for saturation adjustment (as an example, ranges [−0.5, 0.5]).

Transfer function, e.g. transfer curve 116 depicts a distinctly different CVT model supported by a target playback device 130. In this example embodiment, transfer curve 116 is defined by a piecewise function—with a linear portion 118 and a non-linear portion 120. Non-linear portion 120 can be any predefined curve, such as an $N^{th}$-order curve. FIG. 1 illustrates non-linear portion 120 as a Bézier curve. The Bézier curve can be a quadratic, cubic or even higher order. As an alternative, non-linear portion 120 can be one or more B-splines, non-uniform rational B-splines, M-splines, I-splines, T-splines, box splines, and any polynomial function. As yet a further alternative, transfer curve 116 can be defined by a single function, and not piecewise.

Transfer function, e.g. transfer curve 116 is characterized by HDR metadata 122, which comprises a metadata set 124 comprised of static metadata (not shown) and dynamic metadata. Dynamic metadata of metadata set 124 can include one or more anchors (e.g., 1, 2, 3, 4, 5 or more) and one or more knee points (e.g., 1, 2, 3, 4, 5 or more) for the Bézier curve tone mapper. These parameters allow one or more fixed points to be set and/or control a slope of the curve in one or more regions. Metadata set 124 further includes image characteristics (e.g., average maximum of color components, fraction of bright pixels, and the like) and target display characteristics (e.g., maximum luminance, and actual peak luminance).

As illustrated in FIG. 1A, the sigmoidal transfer function, e.g. sigmoidal transfer curve 114, determined from source content metadata 110, is used to compute a best fit (or perceptually reasonable fit) to transfer function, e.g. transfer curve 116 by metadata transformation unit 126. Fit can be determined by, as examples, multivariate linear regression, simple linear regression, sum of squares, offset absolute values, least squares (linear or non-linear), root-mean-square error, average absolute deviation, or mean squared error. The resulting fit defines at least one metadata parameter of dynamic metadata of metadata set 124. The fit characterizes the linear portion 118, non-linear portion 120, or both. In other words, necessary anchor and knee points for an appropriate Bézier curve can be computed.

A perceptually reasonable fit or match can be a solution that satisfies a predefined criteria, such as an error between transfer curves is less than a predetermined amount or percentage (e.g., less than 5%) over a range of values. Alternatively, it can be acceptable if a computed worse-case error in reproduction of any pixel of the scene (or picture) will not exceed a specific threshold—for example, less than about 3, 5 or 8 cd/m$^2$, or alternatively less than about 1 to 4 just noticeable differences (JNDs). For a particular embodiment of the invention, an objectively determined JND value according to Weber's law (e.g., $\Delta L/L$ equals a constant, Weber's constant) for a wide range of luminances can be used. The Weber constant can be less than about 0.01, 0.005, or 0.001. Weber's law provides a reasonable metric for JND value, although adaptation of the human visual system differs between individual and, in fact, it is not constant for all luminance levels or spatial frequencies for an individual.

As a specific embodiment, minimization or elimination of error at one or more specific points of the transfer curves can be desirable. That is to say, the fit can exactly match the transfer curves for at least one of midpoint, maximum point, and minimum point, despite any increase in error elsewhere. This may be acceptable in order to better preserve creative intent. For example, if the midpoint is exactly matched (or mid-tones given greater weight for curve fit), faithful reproduction of skin pigmentation or other salient features can be prioritized over brilliant highlights. In this way, mid-tone values are consistently mapped regardless of CVT model. Midpoint can be the mean, median, or average color component value in a scene or picture. It can be computed or determined by a histogram of the scene or picture.

As yet another alternative, the fit can best match the slopes of the transfer curves (e.g., transfer curves 114 and 116) at a certain point or within a predetermine response range (e.g., mid-range values). The predetermined range can be, as an example, within +/−10% of the midpoint or less. If a transfer curve is a piecewise curve, then each slope or curve segment can be weighted differently for fit determination. For example, the metadata transformation unit 126 can emphasize the non-linear portion over the linear portion of transfer curve 116 by giving it greater weight for calculations.

To the extent not all parameters of metadata set 124 are defined by metadata transformation unit 126, then default values can be applied. For example, color saturation weight parameter can be set to about ⅓, ½, or 1, when not resolved by metadata transformation unit 126. As another example, a parameter for a fraction of bright pixels in a scene or picture can be set to about 0, ½ (50%), or 1 (100%), as a default value.

Once dynamic metadata of metadata set 124 is computed, target playback device 130 can render HDR master content, e.g. source content 100, guided by HDR metadata 122, to its optimal capability while maintaining creative intent. As stated previous, target playback device 130 can be an SDR device, in which case. source content 100 is tone mapped down to a lower dynamic range and/or lower color gamut. On the other hand, if target playback device 130 is a superior HDR device, then source content 100 can be mapped to a higher dynamic range and/or wider color gamut.

Figure 1B:
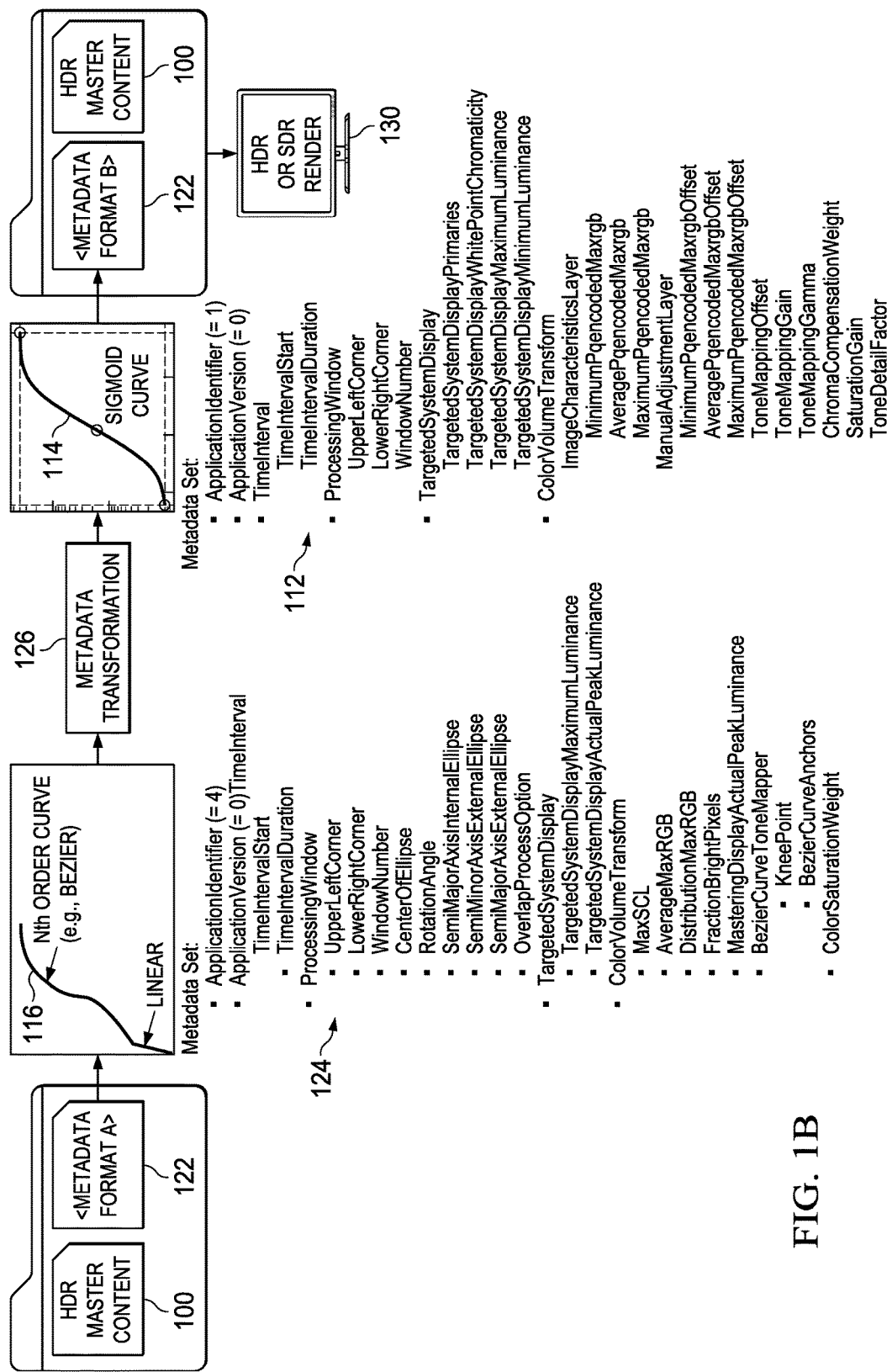
FIG. 1B depicts a simplified flowchart depicting one embodiment of the invention.

FIG. 1B depicts a simplified flowchart depicting another embodiment of the invention. In this embodiment, metadata transformation unit 126 determines parameters for a transfer function of a first CVT model based, at least in part, on metadata describing a second CVT model with another transfer function. Specifically, a piecewise transfer function, e.g. transfer curve 116, determined from metadata set 124, is used to compute a best fit (or reasonable fit) to transfer function, transfer curve 114. Fit can be determined by, as examples, multivariate linear regression, simple linear regression, sum of squares, offset absolute values, least squares (linear or non-linear), root-mean-square error, average absolute deviation, or mean squared error. The resulting fit defines at least one metadata parameter of dynamic metadata of metadata set 112. The fit characterizes a resulting transfer function by its parameterized metadata characteristics.

To the extent, not all parameters of metadata set 112 are defined as a result of metadata transformation unit 126, then default values can be applied. For example, color component offsets (e.g., minimum, maximum, and average component offsets) can be set to 0, when not resolved by metadata transformation unit 126. As another example, a parameter for tone mapping gain in a scene or picture can be set to about ½ (50%) or 1 (100%), as a default value.

Once dynamic metadata of metadata set 112 is computed, target playback device 130 can render HDR master content, e.g. source content 100, guided by HDR metadata of metadata set 112, to its optimal capability while maintaining creative intent. As stated previous, target playback device 130 can be an SDR device, in which case source content 100 is tone mapped down to a lower dynamic range and/or lower color gamut. On the other hand, if target playback device 130 is a superior HDR device, then source content 100 can be mapped to a higher dynamic range and/or wider color gamut.

It should be appreciated that metadata transformation unit 126 can be performed in real-time, in situ by an HDR device (e.g., television, mobile telephone, set-top box, game console, home theater media server, cinema server, Blu-ray player and the like), including a target playback device 130. Alternatively, metadata transformation unit 126 can be conducted offline and/or remotely. If metadata transformation unit 126 is remotely performed, then target playback device 130 can access from a repository (e.g., a database network, whether centralized or geographically distributed for proximity to end users) and download a previously computed metadata set for HDR content master, e.g. source content 100. In this case, the metadata set can be transmitted as a standalone bitstream, if source content 100 is already resident on target playback device 130. If the metadata set is remotely accessed, then encryption and forensic marking can be used for enhanced security.

Figure 2A:
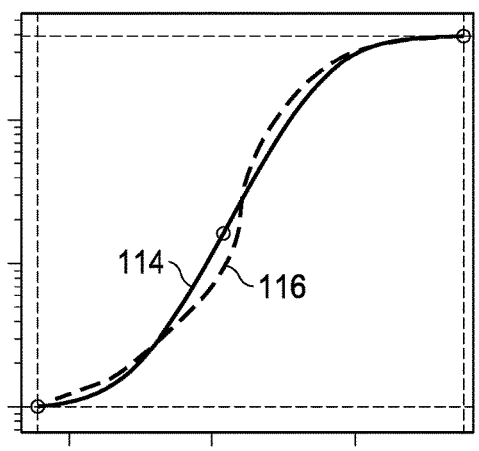
FIGS. 2A-2C show examples of curve fitting for two transfer curves of differing CVT models.
Figure 2B:
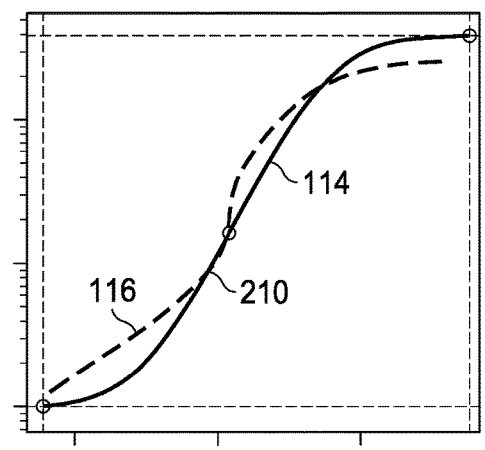
Figure 2C:
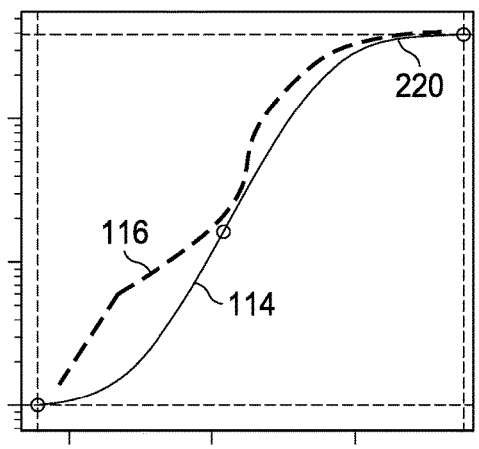

FIGS. 2A-2C show mere examples of curve fitting transfer curves of two distinctly different CVT models. In FIG. 2A, the difference or resulting error between transfer curves 114 and 116 is minimized for a best fit match over the entire dynamic range. FIG. 2B shows transfer curves 114 and 116 are matched at point 210. This ensure reliable reproduction of color component values at or about point 210. Lastly, FIG. 2B shows matching transfer curves 114 and 116 at or near saturation 220.

Figure 3:
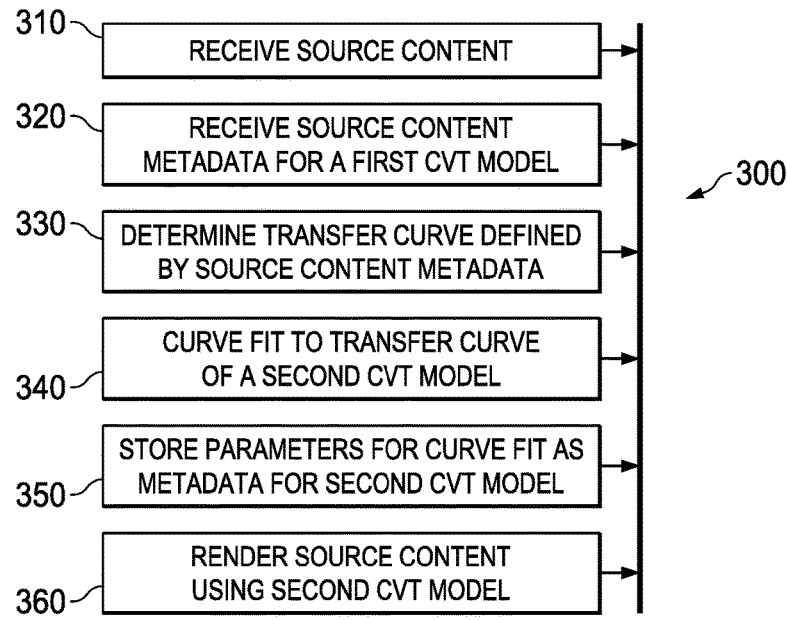
FIG. 3 depicts a simplified method in accordance with one embodiment of the invention.

FIG. 3 depicts a simplified method 300 in accordance with one embodiment of the invention. Although method 300 is described below in terms of some sequential operations, it should be appreciated that some of the operations described may be performed in a different order. Moreover, some operations may be performed in parallel rather than sequentially, or optionally.

First, in step 310, source content is received by an HDR device. Source content metadata associated with a first CVT model is received in step 320. Source content metadata can be as described for FIGS. 1A-1B. In steps 330 and 340, a first transfer curve under the first CVT model is determined and curve fitted to a second transfer curve of a second CVT model. The first and second CVT models can be distinctly different. Parameters defining the curve fit are stored in step 350 as metadata for the second CVT model. Lastly, at step 360, a target device can render source content according to the second CVT model based on the generated parameters. For step 360, the target device can render source content within its capabilities, including after further color volume transformation, pixel subsampling, upsizing, downsizing, re-sizing, up-scaling, down-scaling, rotation, color saturation clipping, or other display rendering operation.

In another technique, tone transfer curves and saturation transfer curves from the first and second CVT models are matched independently. In tone curve matching, metadata from the first model is used to generate a first tone curve. A second tone curve for the second model is used to calculate metadata for the second model or, alternatively, create metadata to match (or reasonably approximate) the second tone curve to the first tone curve. In saturation curve matching, metadata from the first model is used to create a first color saturation curve. A second saturation curve for the second model is used to calculate metadata for the second model or, alternatively, create metadata for the second model to match (or reasonably approximate) the second saturation curve to the first saturation curve.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to color volume transformation of images with high dynamic range, such as those described herein. The computer and/or IC may compute any of a variety of parameters or values that relate to the color volume transformation processes described herein. The image and video embodiments may be implemented in hardware, software, firmware and various combinations thereof.

Certain implementations of the invention comprise at least one computer processor which execute software instructions which cause the processors to perform a method of the invention. For example, one or more processors in display, encoder, set top box, game console, home media server, mobile cellular telephone, a transcoder or the like may implement methods related to color volume transformations of HDR images as described above by executing software instructions in a computer readable program memory accessible to the processors. The invention may also be provided in the form of a program product, e.g. computer program. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

The functions of each of the components may be performed by multiple electronic devices, e.g. an electronic device, a secondary electronic device, a tertiary electronic device, etc., a combination of electronic devices or may be performed by a single electronic device.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
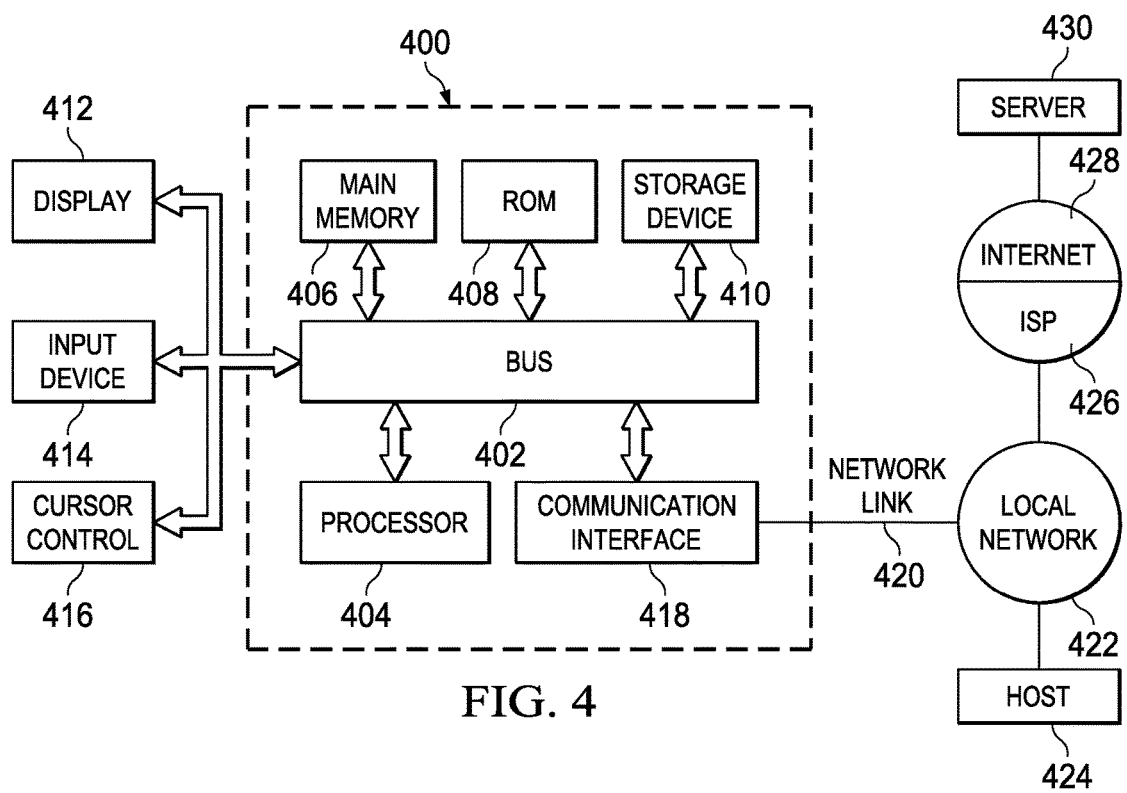
FIG. 4 illustrates a simplified block diagram of an example hardware platform on which a computer or computing device as described herein can be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a liquid crystal display, for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques as described herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

EQUIVALENTS, EXTENSIONS,
ALTERNATIVES AND MISCELLANEOUS

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer or integrated circuit implemented method for enhanced reproduction of high dynamic range content, the method comprising:
   receiving, by at least one computer processor or integrated circuit, source content metadata for a first color volume transformation model;
   determining, by the at least one computer processor or integrated circuit, a first transfer curve for the first color volume transformation model based on the received source content metadata; and
   mapping, by the at least one computer processor or integrated circuit, the first transfer curve of the first color volume transformation model to a second transfer curve of a second color volume transformation model, the mapping comprising a curve fitting of the first transfer curve of the first color volume transformation model to the second transfer curve of the second color volume transformation model; and
   wherein said mapping generates content metadata for the second color volume transformation model.

2. The method of claim 1, wherein the curve fitting comprises a best fit match of the first transfer curve of the first color volume transformation model to the second transfer curve of the second color volume transformation model and wherein said first transfer curve is a first tone transfer curve and said second transfer curve is a second tone transfer curve.

3. The method of claim 1, wherein the curve fitting comprises a perceptually reasonable match of the first transfer curve of the first color volume transformation model to the second transfer curve of the second color volume transformation model and wherein said first transfer curve is a first tone transfer curve and said second transfer curve is a second tone transfer curve.

4. The method of claim 1, wherein the generated content metadata of the second color volume transformation model includes at least knee point and an anchor for a Bezier curve.

5. The method of claim 4, wherein the source content metadata of the first color volume transformation model includes minimum, average and maximum color component values for at least one of a picture and a delineated group of pictures.

6. The method of claim 1, wherein the generated content metadata of the second color volume transformation model includes minimum, average and maximum color component values for at least one of a picture and a delineated group of pictures.

7. The method of claim 6, wherein the source content metadata of the first color volume transformation model includes at least one knee point and an anchor for a Bezier curve.

8. The method of claim 1, wherein the mapping comprises a color saturation mapping.

9. The method of claim 1, wherein the mapping comprises a luminance mapping.

10. The method of claim 1, wherein the mapping comprises a tone mapping.

11. The method of claim 1, wherein the mapping is performed in at least one of real-time and near real-time.

12. The method of claim 1, wherein the mapping is performed in a networking cloud.

13. The method of claim 1, wherein the mapping is performed off-line.

* * * * *